United States Patent
Kettelarij et al.

(10) Patent No.: US 11,273,597 B2
(45) Date of Patent: Mar. 15, 2022

(54) PRINTER UNIT FOR A 3D-PRINTING APPARATUS AND METHOD

(71) Applicant: SIGNIFY HOLDING B.V., Eindhoven (NL)

(72) Inventors: Hendrik Jan Kettelarij, Eindhoven (NL); Peter Tjin Sjoe Kong Tsang, Eindhoven (NL); Hans Kroes, Olst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 89 days.

(21) Appl. No.: 16/493,603

(22) PCT Filed: Mar. 5, 2018

(86) PCT No.: PCT/EP2018/055324
§ 371 (c)(1),
(2) Date: Sep. 12, 2019

(87) PCT Pub. No.: WO2018/166827
PCT Pub. Date: Sep. 20, 2018

(65) Prior Publication Data
US 2020/0061911 A1  Feb. 27, 2020

(30) Foreign Application Priority Data
Mar. 14, 2017 (EP) .................... 17160716

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/245* (2017.08); *B33Y 10/00* (2014.12); *B33Y 30/00* (2014.12)

(58) Field of Classification Search
CPC ... B29C 64/209; B29C 64/118; B29C 64/232; B33Y 30/00; B33Y 10/00
See application file for complete search history.

(56) References Cited

U.S. PATENT DOCUMENTS

| | | |
|---|---|---|
| 7,297,304 B2 | 11/2007 | Swanson et al. |
| 2015/0239178 A1 | 8/2015 | Armstrong |

(Continued)

FOREIGN PATENT DOCUMENTS

| | | |
|---|---|---|
| CN | 203651190 U | 6/2014 |
| CN | 204955426 U | 1/2016 |

(Continued)

*Primary Examiner* — Joseph S Del Sole
*Assistant Examiner* — Mohamed K Ahmed Ali
(74) *Attorney, Agent, or Firm* — Daniel J. Piotrowski (57) ABSTRACT

A printer unit (100) for a 3D-printing apparatus for deposition of a printing material, as well as a method of 3D printing, is provided. The printer unit comprises a printer head (105) comprising a nozzle (110). The printer head is resiliently suspended in the printer unit in a vertical direction by at least one resilient means (120), allowing a vertical movement of the printer head during deposition of the printing material. The suspended printer head in its equilibrium is positionable above the underlying material at a vertical distance ($\Delta z_1$) before deposition. During deposition of printing material, the at least one resilient means is configured to become biased by a vertical force ($F_3$) on the nozzle from the printing material on the underlying material, such that the printer head moves from its equilibrium into a position at a desired vertical distance ($\Delta z_1$) from the underlying material.

7 Claims, 5 Drawing Sheets

(51) Int. Cl.
    *B29C 64/245*    (2017.01)
    *B33Y 10/00*     (2015.01)
    *B33Y 30/00*     (2015.01)

(56) References Cited

U.S. PATENT DOCUMENTS

| | | |
|---|---|---|
| 2016/0075089 A1 | 3/2016 | Duro et al. |
| 2016/0151833 A1 | 6/2016 | Taso |
| 2016/0271871 A1 | 9/2016 | Lee et al. |
| 2016/0346998 A1 | 12/2016 | Mark et al. |
| 2020/0198234 A1 * | 6/2020 | Kuster .................. B33Y 10/00 |

FOREIGN PATENT DOCUMENTS

| | | |
|---|---|---|
| CN | 105711093 A | 6/2016 |
| CN | 205467414 U | 8/2016 |
| JP | 2003502184 A | 1/2003 |
| KR | 100873195 B1 | 12/2008 |
| TW | 201632363 A | 9/2016 |

\* cited by examiner

PRINTER UNIT FOR A 3D-PRINTING APPARATUS AND METHOD

CROSS-REFERENCE TO PRIOR APPLICATIONS

This application is the U.S. National Phase application under 35 U.S.C. § 371 of International Application No. PCT/EP2018/055324, filed on Mar. 5, 2018, which claims the benefit of European Patent Application No. 17160716.1, filed on Mar. 14, 2017. These applications are hereby incorporated by reference herein.

FIELD OF THE INVENTION

The present invention generally relates to the field of 3D printing. More specifically, the present invention relates to a printer unit for a 3D printing apparatus, and a printing method.

BACKGROUND OF THE INVENTION

Additive manufacturing, sometimes also referred to as 3D printing, refers to processes used to synthesize a three-dimensional object. 3D printing is rapidly gaining popularity because of its ability to perform rapid prototyping without the need for assembly or molding techniques to form the desired article.

By using a 3D-printing apparatus, an article or object may be built in three dimensions in a number of printing steps that often are controlled by a computer model. For example, a sliced 3D model of the object may be provided in which each slice is recreated by the 3D printing apparatus in a discrete printing step.

One of the most widely used 3D-printing processes is Fused Filament Fabrication (FFF). FFF printers often use a thermoplastic filament which in its molten state is ejected from a nozzle of the printer. The material is then placed layer by layer, to create a three-dimensional object. FFF printers are relatively fast and can be used for printing objects of various kinds, even those having relatively complex structures.

During 3D-printing, it is desirable to provide an adequate adherence of the printing material to the underlying material, and that the deposited layer of printing material has a predictable layer thickness and layer width. As a consequence, the deposited layer may be provided as a relatively smooth, homogeneous surface.

It should be noted that current FFF printer heads are typically mounted rigidly (mechanically/vertically fixed) which makes it difficult to provide the advantageous, above-mentioned properties of the layer(s) of printing material. To overcome this, some prior art arrangements suggest an increased versatility during printing by providing arrangements comprising articulable robotic arms. However, arrangements of these kinds are relatively complex and/or error-prone, which consequently may lead to an inferior accuracy during printing.

Hence, alternative solutions are of interest, which are able to deposit one or more layers of printing material with a predictable layer thickness and layer width, resulting in a relatively smooth, homogeneous layer surface.

SUMMARY OF THE INVENTION

It is an object of the present invention to mitigate the above problems and to provide a printer unit and a method which are able to deposit one or more layers of printing material with a predictable layer thickness and layer width, resulting in a relatively smooth, homogeneous layer surface.

This and other objects are achieved by providing a printer unit and a method having the features in the independent claims. Preferred embodiments are defined in the dependent claims.

Hence, according to a first aspect of the present invention, there is provided a printer unit for a 3D-printing apparatus for deposition of a printing material. The printer unit comprises a printer head comprising a nozzle. The nozzle is arranged to deposit, in a vertical direction and on an underlying material, at least one filament of a printing material supplied to the nozzle. The printer head is resiliently suspended in the printer unit in a vertical direction by at least one resilient means, allowing a vertical movement of the printer head during deposition of the printing material. The suspended printer head in its equilibrium is positionable above the underlying material at a vertical distance before deposition. During deposition, the at least one resilient means is configured to become biased by a vertical force on the nozzle from the printing material on the underlying material, such that the printer head moves from its equilibrium into a position at a desired vertical distance from the underlying material.

According to a second aspect of the present invention, there is provided a method of 3D printing. The method comprises the step of providing a printer unit according to the first aspect of the present invention. The method further comprises the step of positioning the suspended printer head in its equilibrium position above an underlying material at a vertical distance before depositing printing material on the underlying material. The method further comprises the step of depositing, by the nozzle, at least one filament of a printing material supplied to the nozzle on the underlying material, whereby the at least one resilient means is configured to become biased by a vertical force on the nozzle from the printing material on the underlying material, such that the printer head moves from its equilibrium into a position at a desired vertical distance from the underlying material.

Thus, the present invention is based on the idea of providing a printer unit for a 3D-printing apparatus which is configured to deposit a printing material to generate a homogeneous surface that is smooth over a relatively large area. The nozzle is resiliently mounted in a vertical direction, and this freedom of movement allows the nozzle to follow the undulations of the underlying material (e.g. a build-plate or previously deposited printing material). Hence, the present invention may keep the distance between the nozzle and the underlying material relatively constant even in case of an uneven topography of the underlying material, which ensures that the printing material adheres to the underlying material and obtains a predicted layer thickness and width. It should be noted that build-plates having relatively large areas may often comprise irregularities such as bumps, waves, etc., and this may especially be the case when the build-plates are heated. The present invention is therefore highly advantageous in that a printing material deposited on a build-plate as underlying material may be provided as a smooth and homogeneous layer.

It will be appreciated that current FFF printer heads are usually rigidly mounted, without any ability for the nozzle to move in a vertical direction, e.g. in order to follow the non-flatness of the underlying material. For relatively small 3D-printing apparatuses and/or arrangements, this is not always necessary because of the print bed assembly being small and relatively flexible, which allows the build-plate to flex away passively from the nozzle when the nozzle pushes against the build-plate. However, relatively large 3D-printing apparatuses and/or arrangements are often constructed much more rigidly to account for the significant weight of the build-plate, and the build-plate is therefore not always able to flex away from the nozzle when any undulations are encountered by the nozzle. As a consequence, the resulting surface finish may be poor due to an inconsistent nozzle-to-build-plate distance. The present invention, on the other hand, overcomes this problem, as the nozzle is resiliently mounted in a vertical direction, allowing the nozzle to follow the undulations of the underlying material, leading to an improved surface finish.

It will be appreciated that the mentioned advantages of the printer unit of the first aspect of the present invention also hold for the method according to the second aspect of the present invention.

The printer unit of the present invention comprises a printer head comprising a nozzle. The nozzle is arranged to deposit, in a vertical direction and on an underlying material, at least one filament of a printing material supplied to the nozzle. By the term "underlying material", it is here meant a build-plate (platform), one or more previously deposited layers of printing material, etc.

The printer head is resiliently suspended in the printer unit in a vertical direction by at least one resilient means. By the term "resiliently suspended", it is here meant that the printer unit is mounted, arranged, or the like, in a resilient manner. By the term "resilient means", it is here meant one or more springs, coils, rubber bands, air-pistons, magnetic devices, air pressure/hydraulic cylinder, etc.

The suspended printer head in its equilibrium is positionable above the underlying material at a vertical distance before deposition. By the term "equilibrium", it is here meant the force balance of the suspended printer head in a vertical direction. During deposition, the at least one resilient means is configured to become biased by a vertical force on the nozzle from the printing material on the underlying material, such that the printer head moves from its equilibrium into a position at a desired vertical distance from the underlying material. In other words, due to the non-zero viscosity of the printing material, the printing material exerts a downward force on the underlying material. Furthermore, the force of the printing material biases the spring upwards in a vertical direction, thereby pushing the nozzle upwards in a vertical direction.

According to an embodiment of the present invention, the at least one resilient means comprises at least one spring. The present embodiment is advantageous in that the spring(s) provides a convenient way of maintaining the downward exerted force constant and thereby maintaining a relatively constant distance between the nozzle and the underlying material.

According to an embodiment of the present invention, the printer head further comprises a first control unit configured to control the force constant of the resilient means. Hence, the first control unit may adapt the force constant of the resilient means during printing. The present embodiment is advantageous in that the first control unit may efficiently adapt the resilience of the resilient means during printing, thereby contributing to an even smoother and/or more homogeneous surface of the printing material.

According to an embodiment of the present invention, the force constant of the at least one resilient means is determined as a function of at least one of a viscosity of the printing material, a topography of the underlying material and a flow rate of the deposition of the printing material. In other words, the force constant of the resilient means may be determined based on one or more of the viscosity of the printing material, a topography of the underlying material, and the flow rate of the deposition of the printing material. Consequently, the force constant may compensate for a different printing material used, a variation of the underlying material and/or a deposition flow rate. The present embodiment is advantageous in that a smoothness of the deposited layer may be achieved to an even higher degree.

According to an embodiment of the present invention, the printer unit may further comprise a first actuator configured to at least partially impede the vertical movement of the printer head. Hence, the first actuator may be configured to limit the vertical movement of the printer head when needed. Furthermore, according to an embodiment of the present invention, the first actuator may be configured to block the vertical movement of the printer head. The present embodiments are advantageous in that the printer unit hereby becomes even more versatile during printing, by impeding the vertical movement of the printer head, or making the vertical movement optional by blocking the movement.

According to an embodiment of the present invention, the first actuator is operable by at least one of electromagnetism, hydraulics and air pressure. Furthermore, the first actuator may, according to an embodiment of the present invention, comprise at least one damping means.

According to an embodiment of the present invention, there may be provided a 3D-printing apparatus, comprising a printer unit according to any one of the preceding embodiments, and a second actuator configured to displace the printer unit in a vertical direction. Hence, in this embodiment, the printer unit comprising a resiliently suspended printer head, may additionally be equipped with an (electrical) actuator like a stepper or servo motor. The present embodiment is advantageous in that the actuator may accurately move the printer unit vertically (i.e. up and down). As a consequence, the possibility to actively control the height position of the printer head is enabled, and the distance between the underlying material and the nozzle may be actively controlled.

According to an embodiment of the present invention, the 3D-printing apparatus may further comprise a plurality of printer heads. By the term "a plurality of printer heads", it is here meant either a 3D-printing apparatus having at least two printer heads mounted on the apparatus, or that a printer head mounted on the apparatus may be exchanged for another printer head. It will be appreciated that the possibility of the second actuator to displace the printer unit in a vertical direction is especially useful for a 3D-printing apparatus comprising a plurality of printer heads, as each printer head may have its own individual levelling calibration relating the nozzle and/or printer head, and/or correction relating the build-plate-to-nozzle height.

According to an embodiment of the present invention, there is provided a 3D-printing arrangement. The 3D-printing arrangement comprises a printer unit according to any one of the preceding embodiments, and a build-plate arranged in a horizontal plane, wherein the nozzle is arranged to deposit at least one filament of a printing material upon the build-plate. It should be noted that irregularities such as bumps, waves, projections, etc., may be frequently occurring on build-plate surfaces. Hence, the present invention is therefore highly advantageous in that a printing material deposited on a build-plate as underlying material may be provided as a smooth and homogeneous layer.

According to an embodiment of the present invention, there may be provided at least one heating unit configured to heat the build-plate. The present embodiment is advantageous in that the heating unit(s) provide a better adhesion of the printing material deposited upon the build-plate. Furthermore, as a heated build-plate may be more susceptible of flatness distortions due to (uneven) thermal expansion, compared to an un-heated build-plate, the possibility of the present invention to allow the nozzle to provide (a) smooth layer(s), in spite of undulations of the underlying material, is of even higher importance.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
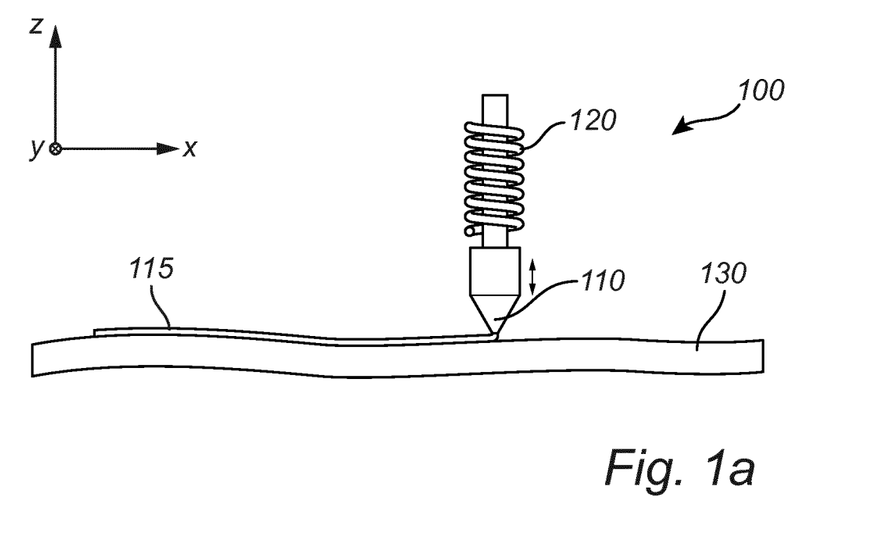
FIGS. 1a-c and FIGS. 2a-d are schematic views of a printer unit for a 3D-printing apparatus according to exemplifying embodiments of the present invention.

FIG. 1a shows a schematic view of a printer unit 100 for a 3D-printing apparatus. It will be appreciated that the printer unit 100 may comprise additional elements, features, etc. However, these are omitted in FIG. 1a for an increased understanding. The printer unit 100 comprises a printer head comprising a nozzle 110 arranged to deposit, in a vertical direction and on an underlying material, at least one filament 115 of a printing material supplied to the nozzle 110. The underlying material is exemplified as a slightly undulated build-plate 130, but may alternatively constitute at least one layer of (previously deposited) printing material. It should be noted that build-plates 130 may be supported and leveled at several points, usually proportional to the size of the build-plate 130, for minimizing the warp of the build-plate 130. After levelling, there is often a certain non-flatness remaining of the build-plate 130. This causes variations in the distance between the nozzle 110 and the build-plate 130, and may furthermore generate variations in surface appearance.

The printing material is extruded from the bottom portion of the tapered nozzle 110. To be able to create a relatively smooth surface of layer(s) of printing material, the first layer of printing material is normally printed with a relatively small layer thickness of 0.1-0.2 mm. It will be appreciated that the distance between the nozzle 110 and the underlying material 130 needs to be well-controlled to produce a relatively smooth surface. The nozzle 110 may be heated by a heater whereby the temperature is kept at a level at which the printing material can flow readily. In FIG. 1a, the deposition of the filament(s) 115 of the printing material is provided in a direction of movement of the nozzle 110 from left to right, i.e. along the x-axis. It will be appreciated that individual filaments 115 may be deposited by the printer unit 100 on top of each other, or alternatively, be arranged adjacently such that the filaments 115 constitute one or more layers.

Figure 1B:
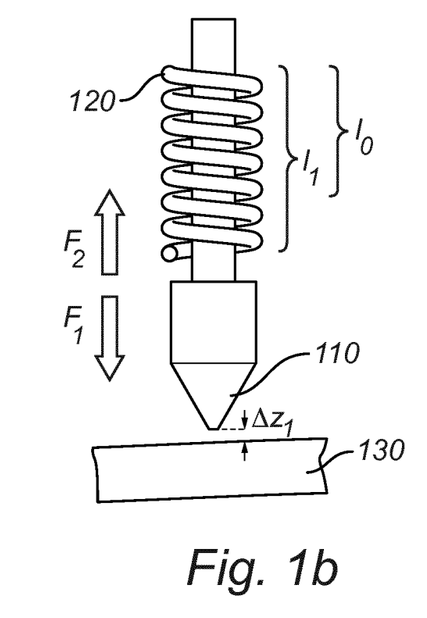

The printer head is resiliently suspended in the printer unit 100 in a vertical direction (z) by one or more resilient means 120. In FIG. 1a, the resilient means is exemplified as a spring 120, but may alternatively take on other forms. The resilient means 120 allows a vertical movement of the printer head during deposition of the printing material. FIG. 1b shows the resiliently suspended printer head in its equilibrium. It should be noted that the arrangement of the spring 120 in relation to the nozzle 110 is merely provided as an example, for illustrative purposes and/or for an increased understanding. Here, the downward force $F_1$ (in the negative z-direction) from the printer head 100 is balanced by the upward vertical force $F_2$ (in the z-direction) from the spring 120, such that $F_1+F_2=0$. Before deposition of printing material, the stretched (biased) spring 120 has a length $l_1$, whereas the length of the unbiased spring 120 is $l_0<l_1$. The tip of the nozzle 110 is hereby positionable at a vertical distance $\Delta z_1$ above the underlying material 130. It will be appreciated that the spring 120 can be mounted in compression or extension.

Figure 1C:
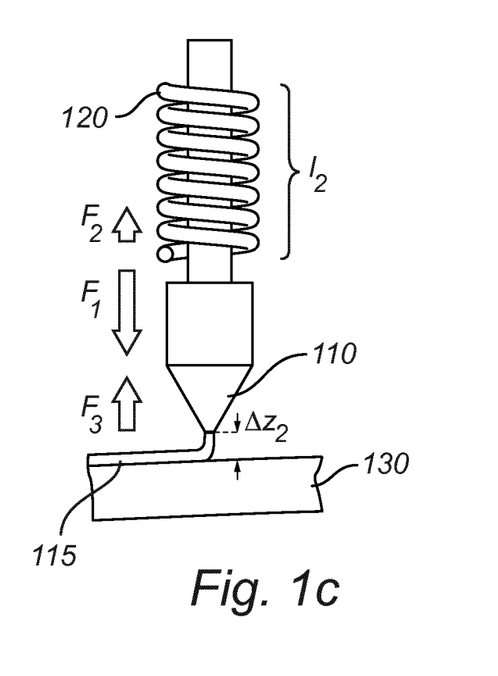

FIG. 1c shows the printer head during deposition of the printing material from the nozzle 110 of the printer unit 100. The spring 120 is further biased by an upwards, vertical force $F_3$ (i.e. in the z-direction) on the nozzle 110 and/or printer head from the printing material on the underlying material 130, such that $F_1+F_2+F_3=0$. Here, the stretched (biased) spring 120 has a length 12, wherein $l_2<l_1$. The force $F_3$ results in a movement of the printer head from its equilibrium of FIG. 1b into a position at a desired, vertical distance $\Delta z_2$ in the z-direction from the underlying material 130. Hereby, the printer head may conveniently follow the underlying material 130 (e.g. a build-plate), even if the underlying material 130 is undulated, irregular and/or non-flat, and create a relatively smooth surface of printing material.

The printer unit 100 may comprise a first control unit (not shown) configured to control the force constant (k) of the resilient means 120. The force constant may be determined as a function of the viscosity of the printing material. Hence, if the printing material is e.g. relatively thick (high viscosity) or, alternatively, relatively thin (low viscosity), the force constant may be determined (set) accordingly. Furthermore, the force constant may be determined as a function of the topography of the underlying material 130. For example, if the underlying material 130 (e.g. a build-plate) is relatively flat, or alternatively, relatively undulated, irregular, dented, damaged, etc., the force constant may be determined (set) accordingly.

The printer unit 100 may comprise a first actuator (exemplified in FIGS. 2b-d) coupled to the resilient means 120. The first actuator may be configured to at least partially impede the vertical movement of the printer head. For example, the first actuator may be configured to (completely) block the vertical movement of the printer head. It will be appreciated that the first actuator may be operable by e.g. electromagnetism and/or air pressure. The first actuator may further comprise one or more damping means (e.g. one or more dampers). For example, the damper may be configured to generate a force $F_4$ (not shown) proportional to the negative velocity of the printer head in the vertical direction.

Figure 2A:
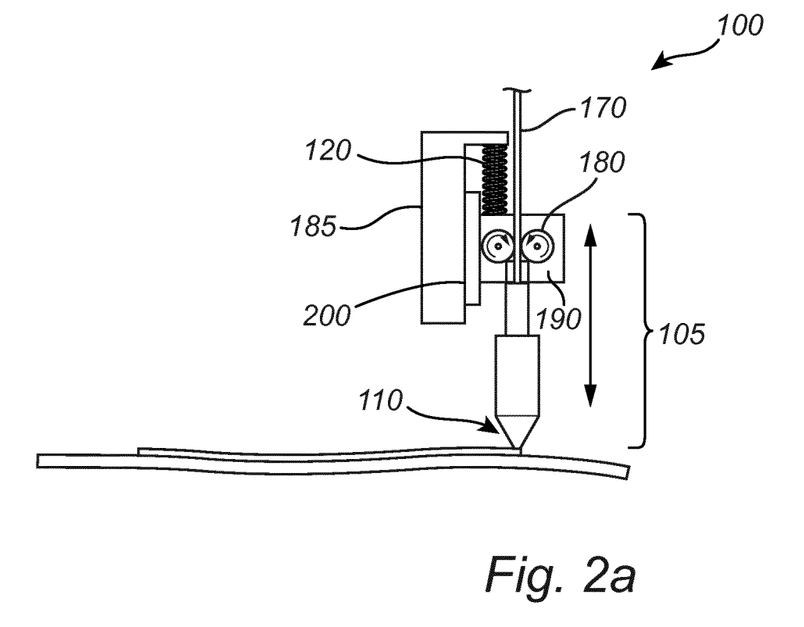

FIG. 2a is a schematic view of a printer unit 100 according to an exemplifying embodiment of the present invention. Here, printing material 170 is fed to the nozzle 110 by a feeder 180. The resilient means 120, in the form of a spring, is coupled to a carriage 185 and a housing 190 of the feeder 180. Between the carriage 185 and the housing 190, there is provided a fixture 200 (e.g. a guide rail) which can move in a vertical direction. Hence, the printer head 105, exemplified as the nozzle 110, the feeder 180 and the housing 190, is resiliently suspended in the printer unit 100 in the vertical direction by the spring 120, allowing a vertical movement of the printer head 105 during deposition of the printing material 170.

Figure 2B:
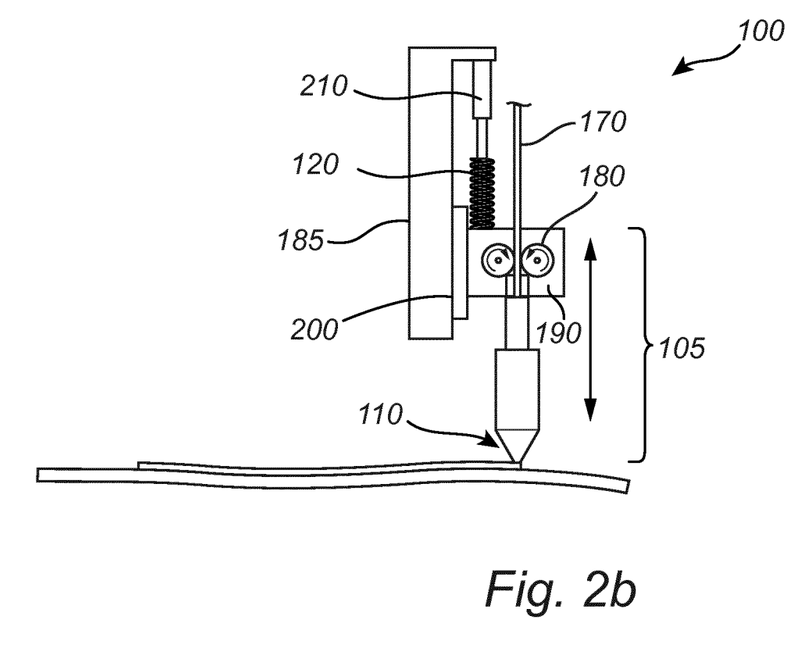

FIG. 2b is a schematic view of a printer unit 100, similar to that exemplified in FIG. 2a. Here, however, a first actuator 210 is coupled to one end of the spring 120 and the carriage 185, i.e. the first actuator 210 is coupled in series with the spring 120. The first actuator 210 is hereby configured to at least partially impede the vertical movement of the printer head 105. For example, the first actuator 210 may constitute a means for active impedance control.

Figure 2C:
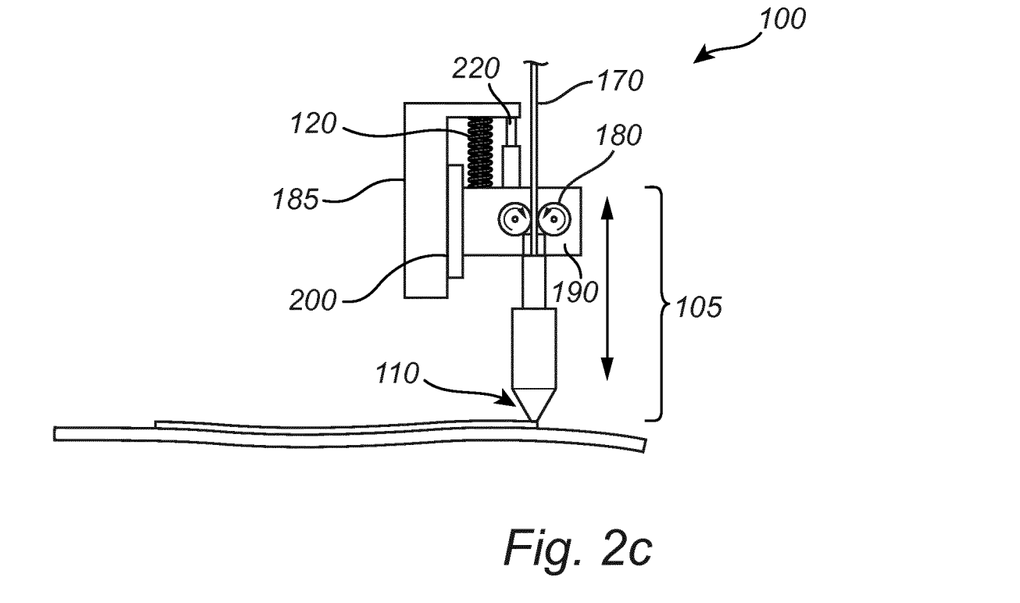

In FIG. 2c, yet another schematic view of a printer unit 100 is exemplified. Here, a first actuator 220 is coupled between the housing 190 and the carriage 185, and is coupled in parallel with the spring 120. In this exemplifying embodiment, the first actuator 220 may constitute an active damper and/or brake for damping and/or breaking the vertical movement of the printer head 105.

Figure 2D:
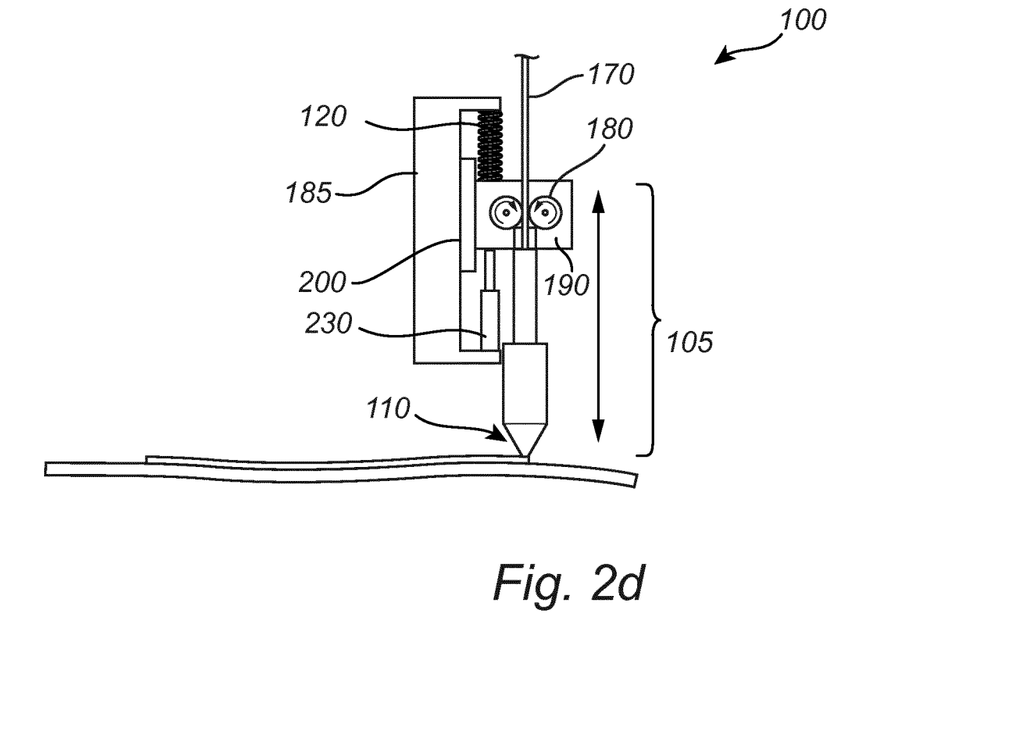

FIG. 2d is yet another schematic view of a printer unit 100, similar to those exemplified in FIGS. 2a-c. Here, the carriage 185 is formed as a staple, wherein the spring 120 is coupled between a first flange of the staple-shaped carriage 185 and the housing 190, and wherein a first actuator 230 is coupled between the housing 190 and a second flange of the staple-shaped carriage 185.

Figure 3:
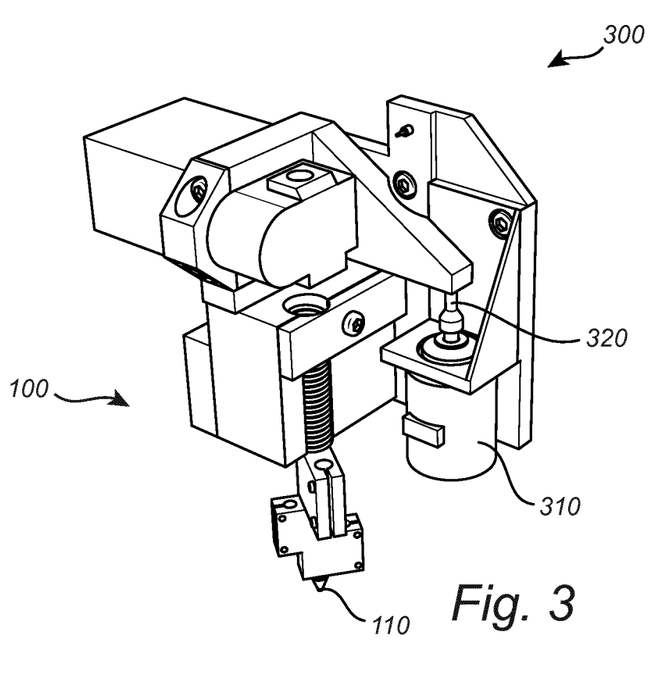
FIG. 3 is a schematic view of a 3D-printing apparatus according to an exemplifying embodiment of the present invention.

FIG. 3 is a schematic view of a 3D-printing apparatus 300 according to an embodiment of the present invention. The 3D-printing apparatus 300 comprises a printer unit 100 according to FIGS. 1a-c and/or FIG. 2. Furthermore, the 3D-printing apparatus 300 comprises a second actuator 310 configured to displace the printer unit 100 in a vertical direction (z-direction). More specifically, the second actuator 310 comprises a motor configured to act on a pushrod 320 which in turn may move the printer unit 100 downwards or upwards. The second, (electrical) actuator 310 may be a stepper motor or servo motor. The 3D-printing apparatus 300 as shown may accurately control the movement of the printer unit 100 vertically (i.e. up and down). As a consequence, the possibility to actively control the height position of the printer head is enabled, and the distance between the underlying material and the nozzle 110 may be actively controlled.

Although not shown, the 3D-printing apparatus 300 in FIG. 3 may further comprise a plurality of printer heads, i.e. at least two printer heads mounted on the apparatus or a set of exchangeable printer heads.

Figure 4:
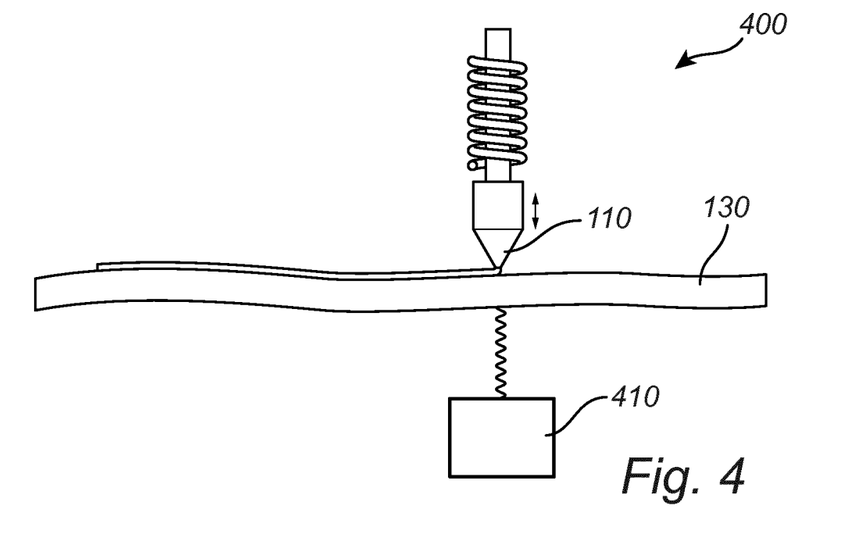
FIG. 4 is a schematic view of a 3D-printing arrangement according to an embodiment of the present invention.

FIG. 4 is a schematic view of a 3D-printing arrangement 400 according to an embodiment of the present invention. The 3D-printing arrangement 400 comprises a printer unit according to any one of the preceding embodiments, and a build-plate 130 arranged in a horizontal plane, wherein the nozzle 110 is arranged to deposit one or more filaments of a printing material upon the build-plate 130. Furthermore, the 3D-printing arrangement 400 comprises a (schematically indicated) heating unit 410 configured to heat the build-plate 130 for a better adhesion of the printing material deposited upon the build-plate 130.

Figure 5:
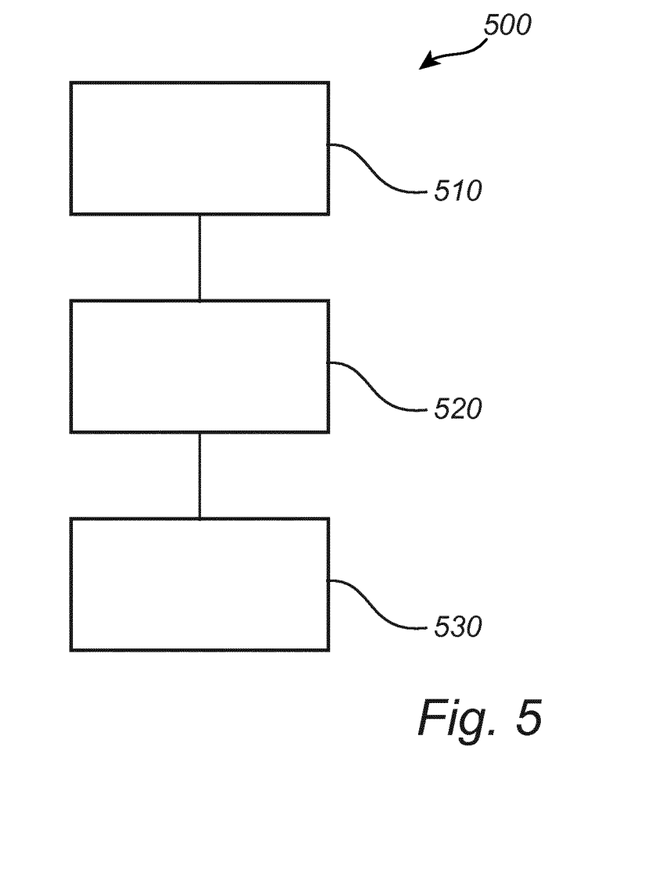
FIG. 5 is a schematic view of a method according to an exemplifying embodiment of the present invention.

FIG. 5 is a schematic view of a method 500 according to an exemplifying embodiment of the present invention. The method comprises the step of providing 510 a printer unit according to the first aspect of the present invention. The method further comprises the step of positioning 520 the suspended printer head in its equilibrium position above an underlying material before depositing printing material on the underlying material.

The method further comprises the step of depositing 530, by the nozzle, at least one filament of a printing material supplied to the nozzle on the underlying material, whereby the at least one resilient means is configured to become biased by a vertical force on the nozzle from the printing material on the underlying material, such that the printer head moves from its equilibrium into a position at a desired vertical distance from the underlying material.

The person skilled in the art realizes that the present invention by no means is limited to the preferred embodiments described above. On the contrary, many modifications and variations are possible within the scope of the appended claims. For example, it will be appreciated that the figures are merely schematic views of printer units according to embodiments of the present invention. Hence, any elements/components of the printer unit 100 such as the nozzle 110, the spring 120, etc., may have different dimensions, shapes and/or sizes than those depicted and/or described. For example, the nozzle 110 and/or the spring 120 may be larger or smaller than what is exemplified in the figures.

The invention claimed is:

1. A printer unit for a 3D-printing apparatus for deposition of a printing material, comprising
    a printer head comprising a nozzle arranged to deposit, in a vertical direction (z) and on an underlying material, at least one filament of a printing material supplied to the nozzle,
    wherein the printer head is resiliently suspended in the printer unit in the vertical direction by at least one resilient means, allowing a vertical movement of the printer head during deposition of the printing material,
    wherein the suspended printer head in its equilibrium is positionable above the underlying material at a vertical distance ($\Delta z_1$) before deposition,
    wherein during deposition, the at least one resilient means is configured to become biased by a vertical force ($F_3$) on the nozzle, the vertical force resulting from the printing material being deposited onto the underlying material, such that the printer head moves from its equilibrium in a direction away from the underlying material and into a position at a desired vertical distance ($\Delta z_2$) above the underlying material, and
    wherein the printer unit further comprises a first actuator configured to at least partially impede the vertical movement of the printer head.

2. The printer unit according to claim 1, wherein the at least one resilient means comprises at least one spring.

3. The printer unit according to claim 1, further comprising a first control unit configured to control the force constant (k) of the resilient means.

4. The printer unit according to claim 1, wherein the force constant of the at least one resilient means is determined as a function of at least one of
    a viscosity of the printing material, and
    a flow rate of the deposition of the printing material.

5. The printer unit according to claim 1, wherein the first actuator is configured to block the vertical movement of the printer head.

6. The printer unit according to claim 5, wherein the first actuator is operable by at least one of electromagnetism, hydraulics and air pressure.

7. The printer unit according to claim 6, wherein the first actuator comprises at least one damping means.

\* \* \* \* \*